United States Patent
Shaw et al.

(10) Patent No.: US 7,351,004 B2
(45) Date of Patent: Apr. 1, 2008

(54) AQUIFER REPLENISHMENT SYSTEM

(75) Inventors: Lee A. Shaw, Newport Beach, CA (US); Ronald D. Shaw, Corona del Mar, CA (US)

(73) Assignee: Shaw & Sons, Inc., Costa Mesa, CA (US)

( * ) Notice: Subject to any disclaimer, the term of this patent is extended or adjusted under 35 U.S.C. 154(b) by 0 days.

(21) Appl. No.: 11/489,006

(22) Filed: Jul. 19, 2006

(65) Prior Publication Data

US 2008/0019770 A1 Jan. 24, 2008

(51) Int. Cl.
*E01C 7/00* (2006.01)
*E01C 11/00* (2006.01)

(52) U.S. Cl. .............. 404/17; 404/31; 405/50

(58) Field of Classification Search .......... 404/17, 404/31, 71; 405/50, 43–45
See application file for complete search history.

(56) References Cited

U.S. PATENT DOCUMENTS

| | | | | |
|---|---|---|---|---|
| 1,884,795 A * | 10/1932 | McKesson | ............ | 404/31 |
| 3,687,021 A * | 8/1972 | Hensley | ............ | 404/31 |
| 3,870,422 A * | 3/1975 | Medico, Jr. | ............ | 404/31 |
| 5,064,308 A * | 11/1991 | Almond et al. | ............ | 405/43 |
| 5,183,355 A * | 2/1993 | Treat et al. | ............ | 405/129.85 |
| 5,487,620 A * | 1/1996 | Holman | ............ | 404/31 |
| 5,788,407 A * | 8/1998 | Hwang | ............ | 404/81 |
| 5,823,706 A * | 10/1998 | Hoare et al. | ............ | 404/28 |
| 6,102,613 A * | 8/2000 | Medico et al. | ............ | 404/17 |
| 6,206,607 B1 * | 3/2001 | Medico et al. | ............ | 404/2 |
| 6,767,160 B2 | 7/2004 | Sansalone | | |
| 6,811,353 B2 | 11/2004 | Madison | | |
| 7,198,432 B2 * | 4/2007 | Chen | ............ | 405/50 |
| 2004/0067103 A1 * | 4/2004 | Hart | ............ | 404/2 |
| 2007/0223998 A1 * | 9/2007 | Hartenburg | ............ | 404/31 |

* cited by examiner

*Primary Examiner*—Thomas B. Will
*Assistant Examiner*—Alina Schiller
(74) *Attorney, Agent, or Firm*—Stetina Brunda Garred & Brucker

(57) ABSTRACT

A concrete structure for replenishing an aquifer and a method for constructing the same is provided. The structure is comprised of a pavement layer with surface drains that extend through the pavement layer and into an aggregate leach field. The leach field includes leach lines spanning the leach field. An aggregate drain extends from the leach field into a sand lens. Precipitation which falls upon the structure thus flows through the surface drain, absorbed into the aggregate leach field, and transported to the aggregate drains by way of aggregate leach lines. The water is then absorbed into the sand lens, ultimately replenishing the aquifer. Existing conventional pavement structures are retrofitted by the removal of a section of the pavement, and filling the same with porous concrete.

9 Claims, 3 Drawing Sheets

AQUIFER REPLENISHMENT SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present invention generally relates to concrete structures and the methods for forming the same. More particularly, the present invention relates to concrete structures and forming methods that enhance the replenishment of underground water in aquifers.

2. Description of Related Art

As is generally understood, a common source of fresh water for irrigation, human consumption, and other uses is groundwater. Usable groundwater is contained in aquifers, which are subterranean layers of permeable material such as sand and gravel that channel the flow of the groundwater. Other forms of groundwater include soil moisture, frozen soil, immobile water in low permeability bedrock, and deep geothermal water. Among the methods utilized to extract groundwater include drilling wells down to the water table, as well as removing it from springs where an aquifer intersects with the curvature of the surface of the earth.

While groundwater extraction methods are well known, much consideration has not been given to the replenishment thereof. It is not surprising that many aquifers are being overexploited, significantly depleting the supply. The most typical method of aquifer replenishment is through natural means, where precipitation on the land surface is absorbed into the soil and filtered through the earth before reaching the aquifer. However, in arid and semi-arid regions, the supply cannot be renewed as rapidly as it is being withdrawn because the natural process takes years, even centuries, to complete. It is well understood that in its equilibrium state, groundwater in aquifers support some of the weight of the overlying sediments. When aquifers are depressurized or depleted, the overall capacity is decreased, and subsidence may occur. In fact, such subsidence that occurs because of depleted aquifers is partially the reason why some cities, such as New Orleans in the state of Louisiana in the United States, are below sea level. It is well recognized that such low-lying and subsided areas have many attendant public safety and welfare problems, particularly when flooding or other like natural disasters occur.

The problem of rapid depletion is particularly compounded in developed areas such as cities and towns, where roads, buildings, and other man-made structures block the natural absorption of precipitation through permeable soil. Generally, building and paving materials such as concrete and asphalt are not porous, in that water cannot move through the material and be absorbed into the soil. In fact, porous material would be unsuitable for construction of buildings, where internal moisture is desirably kept to a minimum. Thus, these developed areas are typically engineered with storm drainage systems whereby precipitation is channeled to a central location, marginally cleaned of debris, bacteria, and other elements harmful to the environment which were picked up along the drainage path, and carried out to the sea. Instead of allowing precipitation to absorb into the ground, modern developed areas transport almost all surface water elsewhere.

One of the methods for replenishing aquifers is described in U.S. Pat. No. 6,811,353 to Madison, which teaches a valve assembly for attachment to aquifer replenishment pipes. However, the use of such replenishment systems required frequent human intervention. Furthermore, in order for the water in the aquifer to remain clean, existing clean water had to be pumped in. Additionally, the volume of water that was able to be carried to these re-charging locations was limited, thus limiting the replenishment capacity.

Changes to paving materials have also been considered. As is well known in the art, concrete is a composite material made from aggregate and a cement binder, the most common form of concrete being Portland cement concrete. The mixture is fluid in form before curing, and after pouring, the cement begins to hydrate and gluing the other components together, resulting in a relatively impermeable stone-like material. By eliminating the aggregate of gravel and sand, the concrete formed miniature holes upon curing, resulting in porous concrete. This form of concrete, while allowing limited amounts of water to pass through, was unsuitable for paving purposes because of its reduced strength. Additionally, the aforementioned drainage systems were still required because the porous concrete was unable to handle all of the water in a typical rainfall. Structures designed to increase the strength while maintaining porosity have been attempted, whereby reinforcement in the form of rods, rebar, and/or fibers were incorporated into the structure. Nevertheless, the strength of the structure was insufficient because of the reduced internal bonding force of the concrete due to the lack of an aggregate.

Therefore, there is a need in the art for an aquifer replenishment system for collecting precipitation and absorbing the same into the pavement and the soil in the immediate vicinity. There is also a need for aquifer replenishment system that are capable of withstanding environmental stresses such as changes in temperature, as well as structural stresses such as those associated with vehicle travel. Furthermore, there is a need for an aquifer replenishment system that can be retrofitted into existing pavement structures.

BRIEF SUMMARY

In light of the foregoing problems and limitations, the present invention was conceived. In accordance with one embodiment of the present invention, an aquifer replenishing pavement is provided, which lies above soil having a sand lens above an aquifer, and a clay layer above the sand lens. The structure is comprised of: an aggregate leach field abutting the subgrade (typically comprised of clay); and a layer of suitable surface paving material such as reinforced concrete or asphalt, abutting the aggregate leach field. Additionally, one or more surface drains extend through the concrete layer, and one or more aggregate drains extend from the aggregate leach field to the sand lens. The surface drains have a higher porosity than the paving layer, and is filled with rocks. According to another aspect of the invention, leach lines having a higher porosity than the surrounding leach field are provided. The surface drains are in direct fluid communication with the leach lines, and the leach lines are in direct fluid communication with the aggregate drains.

An aquifer replenishing concrete paving method is also provided, comprising the steps of: (a) clearing and removing a top soil layer until reaching a clay layer; (b) forming one or more aggregate drains through the clay layer to a sand lens; (c) forming an aggregate leach field above the clay layer; (d) forming a pavement layer above the aggregate leach field; and (e) forming surface drains extending the entire height of the pavement layer. Additionally, forming of the aggregate leach field also includes the step of forming one or more leach lines therein.

In accordance with another embodiment of the present invention, an aquifer replenishing concrete gutter for use on a road surface with an elevated curb section is provided. The gutter is comprised of a porous concrete section having an exposed top surface in a co-planar relationship with the road surface, supported by the elevated curb section and the side surface of the road. According to another aspect of the present invention, a cut-off wall is provided to further support the porous concrete section. A bore extending from the porous concrete down to the aquifer is also provided, and is filled with rocks.

An aquifer replenishing concrete gutter formation method is provided, comprising the steps of: (a) forming a gutter section between an elevated curb section and a road surface; (b) boring a hole in the gutter section into the aquifer; (c) filling the hole with rocks; (d) filling the gutter section with porous concrete; and (e) curing the porous concrete. In accordance with another aspect of the present invention, step (a) includes removing a section of the road surface adjacent to the elevated curb section. Finally, step (a) also includes forming a cut off wall extending downwards from the road surface and offset from the elevated curb section.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the presently preferred embodiment of the invention, and is not intended to represent the only form in which the present invention may be constructed or utilized. It is to be understood, however, that the same or equivalent functions may be accomplished by different embodiments that are also intended to be encompassed within the spirit and scope of the invention.

Figure 1:
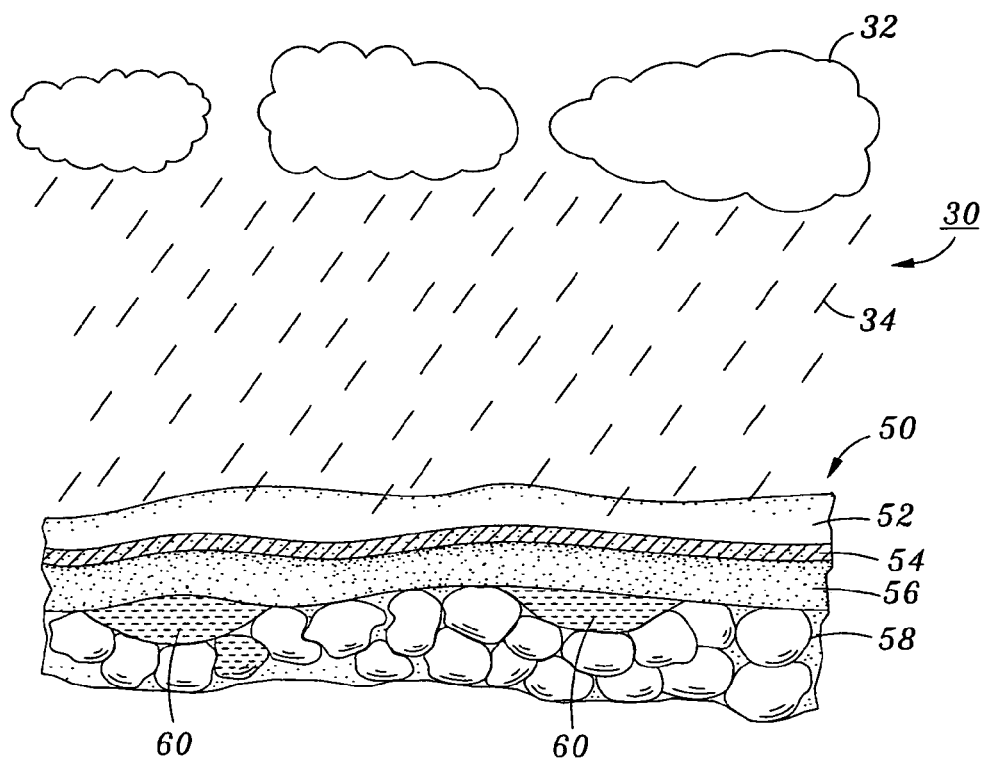
FIG. 1 is a cross-sectional view of the surface of the earth.

With reference now to FIG. 1, a cross sectional view of the earth's surface is shown. Atmosphere 30 is shown with clouds 32 releasing precipitation 34, falling towards the ground 50. As is well understood, ground 50 is comprised of top soil layer 52. Underneath top soil layer 52 is clay layer 54, and underneath that is sand lens 56. Aquifer 60 is a layer of water, and can exist in permeable rock, permeable mixtures of gravel, and/or sand, or fractured rock 58. Precipitation 34 falls on top soil layer 52, and is gradually filtered of impurities by the varying layers of sand, soil, rocks, gravel, and clay as it moves through the same by gravitational force, eventually reaching aquifer 60. In the context of the above natural features, the present invention will be described.

Figure 2:
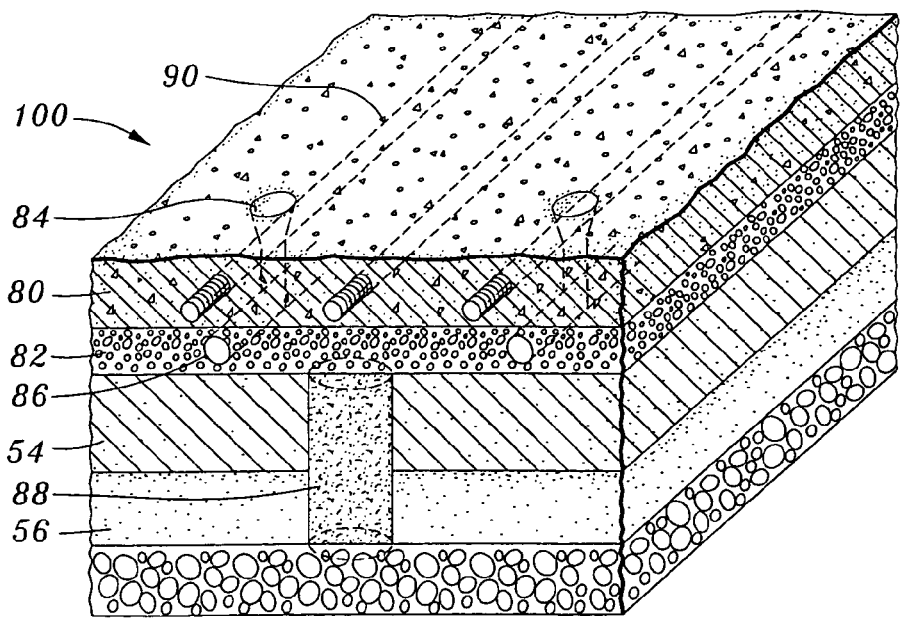
FIG. 2 is a perspective cross-sectional view of a road surface aquifer replenishment system in accordance with an aspect of the present invention.

Referring now to FIG. 2, a first embodiment of the present inventive concrete paving system 100 is shown. Situated above clay layer 54 is an aggregate leach field 82 comprised of sand and gravel particles. Above aggregate leach field 82 is a pavement layer 80, which by way of example only and not of limitation, is concrete composed of Portland cement and an aggregate. Pavement layer 80 may be reinforced with any reinforcement structures known in the art such as rebar, rods and so forth for increased strength. Preferably, the reinforcement structure has the same coefficient of thermal expansion as the pavement material, for example, steel, where concrete is utilized, to prevent internal stresses in increased temperature environments. By way of example only and not of limitation, pavement layer 80 has reinforcement bars 90. It will be appreciated by one of ordinary skill in the art that the pavement layer 80 need not be limited to architectural concrete, and asphalt and other pavement materials may be readily substituted without departing from the scope of the present invention.

Extending from the top surface to the bottom surface of pavement layer 80 are one or more surface drains 84. Due to the fact that non-porous concrete, that is, concrete having aggregate mixed into the cement, permits little water to seep through, surface drains 84 expedite the water flow into aggregate leach field 82. Typically, by way of example only and not of limitation, surface drains 84 are filled with rocks to prevent large debris such as leaves and trash from clogging the same.

Within aggregate leach field 82 are one or more leach lines 86, which assist the transfer of fluids arriving through surface drains 84. By way of example only, leach lines 86 are in direct fluid communication with surface drains 84. Leach lines 86 have a higher porosity than the surrounding leach field 82 to enable faster transmission of fluids. Leach field 82 is also capable of absorbing water, and in fact, certain amounts are absorbed from leach lines 86. Additional water flowing from surface drains 84 is also absorbed into leach field 82. In this fashion, water is distributed across the entire surface area of leach field 82, resulting in greater replenishment of the aquifer. A person of ordinary skill in the art will recognize that the leach field 82 acts as a filter by gradually removing particulates from precipitation, and resulting in cleaner water in the aquifer.

As is well understood in the art, clay has a lower porosity as compared to an aggregate of, for example, sand, gravel, or soil. In order to expedite the transmission of water into the aquifer, aggregate drains 88 extend from aggregate leach field 82, through clay layer 54, and into sand lens 56. Therefore, a minimal amount of water is absorbed into the clay layer 54, and the replenishment process is expedited.

After the water flows from leach field 82 into sand lens 56 via aggregate drains 88, it is dispersed throughout sand lens 56, trickling through to the aquifers in the vicinity. The water in the aquifer is thus replenished through largely natural means, namely the filtration process involved in absorbing precipitation through aggregate leach field 82 and sand lens 56, despite the existence of a non-porous material such as concrete overlying the ground surface in the form of pavement layer 80.

The aquifer replenishment system as described above is generally formed over previously undeveloped land, or any land that has been excavated to a clay layer 54. Thus, surfaces that have been previously paved by other means must first be removed so that the natural water absorption mechanisms of the earth are exposed. After this has been completed, aggregate drains 88 are drilled from the exposed clay surface 54 into sand lens 56. After filling the aggregate drains 88 with aggregate, a generally planar aggregate leach field 82 is formed. Contemporaneously, leach lines 86 are formed, and is encapsulated by the aggregate which constitutes leach field 82. After leach field 82 is constructed, concrete reinforcements 90 are placed, and uncured concrete is poured to create pavement layer 80.

With respect to the formation of surface drains 84, any conventionally known methods of creating generally cylindrical openings in concrete may be employed. For example, before pouring the uncured concrete, hollow cylinders may be placed and inserted slightly into leach field 82 to prevent the concrete from flowing into the opening. Yet another example is pouring the concrete and forming a continuous layer, and drilling the concrete after curing to form surface drain 84. It is to be understood that any method of forming surface drain 84 is contemplated as within the scope of the present invention.

Figure 3:
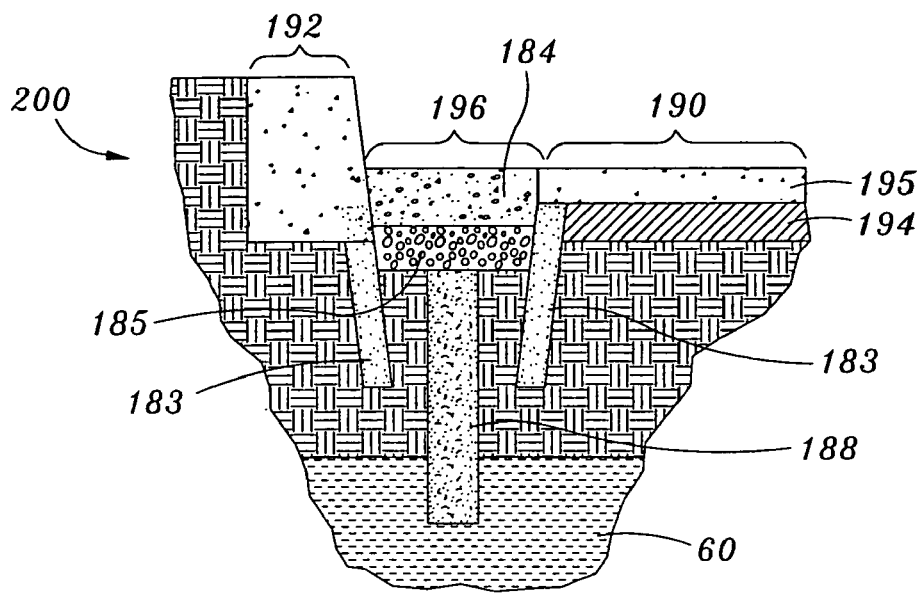
FIG. 3 is a cross-sectional view of a gutter aquifer replenishment system in accordance with an aspect of the present invention.

With reference to FIG. 3, a second embodiment of the aquifer replenishing system 200 is shown, including an elevated curb section 192, a gutter section 196, and a road pavement section 190. Road pavement section 190 is comprised of a pavement surface 195, which by way of example only and not of limitation, is architectural concrete, asphalt concrete, or any other paving material known in the art, and is supported by base course 194. Base course 194 is generally comprised of larger grade aggregate, which is spread and compacted to provide a stable base. The aggregate used is typically ¾ inches in size, but can vary between ¾ inches and dust-size.

In accordance with the present invention, gutter section 196 has a porous concrete gutter 184 in which the top surface thereof is in a substantially co-planar relationship with the top surface of pavement surface 195. Optionally, porous concrete gutter 184 is supported by base 185 which is composed of similar aggregate material as base course 194. Furthermore, extending from optional base 185 into aquifer 60 is a rock filled bore 188. As a person of ordinary skill in the art will recognize, a bore filled with rocks will improve the channeling of water due to its increased porosity as compared with ordinary soil. Optional base 185 and porous concrete gutter 184 is laterally reinforced by cut off walls 183 and elevated curb section 192. The cut off walls 183 are disposed on opposing sides of the porous concrete gutter 184 and the base 185 between the elevated curve section 192 and the pavement surface 195. It is expressly contemplated that the cut off walls 183 may be pre-cast or cast in place.

When precipitation falls upon road pavement section 190, the water is channeled toward gutter section 196. Porous concrete gutter 184 permits the precipitation to trickle down to aquifer 60. When optional base 185 and rock filled bore 188 is in place, there is an additional filter effect supplementing that of the porous concrete gutter 184. A similar result can be materialized where the water drains from the upper surface of elevated curb section 192, or precipitation directly falls upon porous concrete gutter 184. Please note a large surface drain may be used in lieu of the porous concrete gutter.

Figure 4:
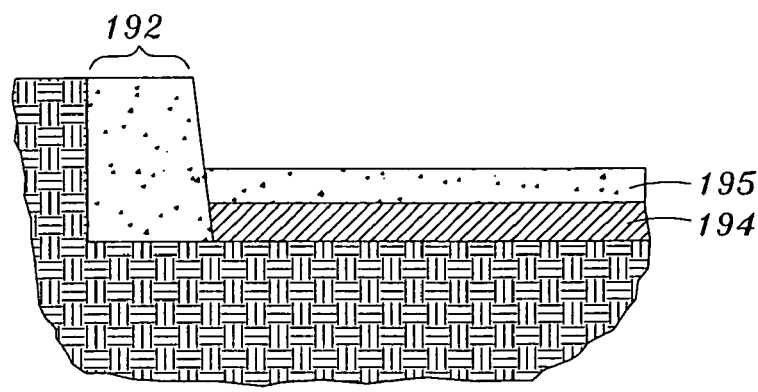
FIG. 4 is a cross-sectional view of a conventional road.
Figure 5:
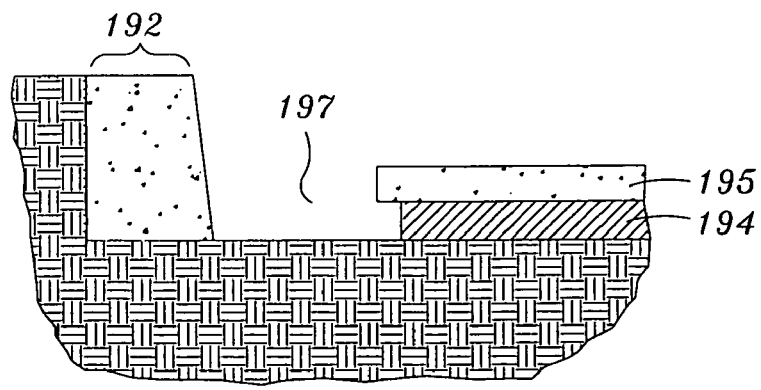
FIG. 5 is a cross-sectional view of a conventional road excavated for retrofitting an aquifer replenishment system in accordance with an aspect of the present invention.
Figure 6:
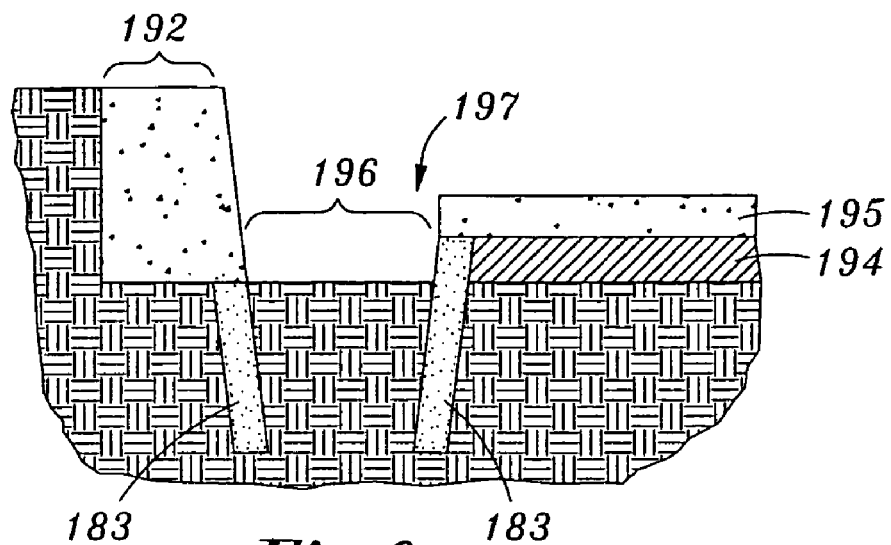
FIG. 6 is a cross-sectional view of conventional road after excavation and formation of a cut-off wall in accordance with an aspect of the present invention.
Figure 7:
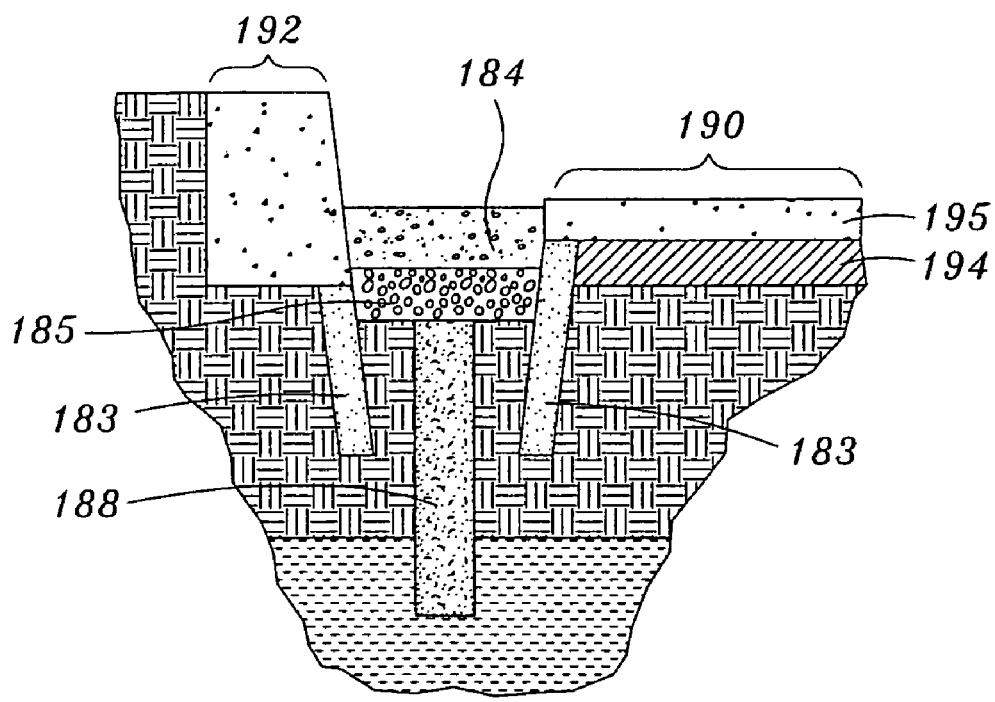
FIG. 7 is a cross sectional view of a road after excavating a bore reaching an aquifer and filling the same with rocks, and depicts the pouring of concrete into the gutter section in accordance with an aspect of the present invention.

This embodiment is particularly beneficial where retrofitting the gutter is a more desirable solution rather than re-paving the entire road surface. In a conventional road pavement as shown in FIG. 4, pavement surface 195 and base course 194 extend to abut elevated curb section 192. In preparation for retrofitting gutter section 196, a section of pavement surface 195 and base course 194 is excavated as shown in FIG. 5, leaving a hole 197 defined by the exposed surfaces of elevated curb section 192, base course 194, and pavement surface 195. This is followed by the optional step of pouring and curing a cut-off wall 183 as illustrated in FIG. 6, which, as discussed above, serves to reinforce the gutter section 196. One or more bores 188 are drilled down to aquifer 60, and filled with rocks, as shown in FIG. 7. An optional base of aggregate 185 is formed above rock filled bore 188, and compacted by any one of well recognized techniques in the art. Finally, a volume of porous concrete mixture, that is, a concrete without sand or other aggregate material, is poured and cured, forming porous concrete gutter 184. While recognizing the disadvantages of using porous concrete, namely, the reduced strength of the resultant structure, a person of ordinary skill in the art will also recognize that gutter section 196 sustains less stress thereupon in normal use as compared to road pavement section 190.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An aquifer replenishing pavement formed above soil having a sand lens above said aquifer and a clay layer above said sand lens, comprising:
   an aggregate leach field having a top surface, and a bottom surface abutting said clay layer;
   a pavement layer having an exposed top surface, and a bottom surface abutting said aggregate leach field;
   one or more surface drains extending from said exposed top surface to said bottom surface of said pavement layer; capable of draining surface water from said exposed top surface to said aggregate leach field; and
   one or more aggregate drains extending from said aggregate leach field into said sand lens through said clay layer further draining said surface water into said aquifer.

2. The aquifer replenishing pavement as set forth in claim 1, wherein said surface drains have a higher porosity than said pavement layer.

3. The aquifer replenishing pavement as set forth in claim 1, wherein said surface drains are filled with rocks.

4. The aquifer replenishing pavement as set forth in claim 1, further comprising one or more leach lines within said aggregate leach field.

5. The aquifer replenishing pavement as set forth in claim 4, wherein said surface drains are in direct fluid communication with said leach lines.

6. The aquifer replenishing pavement as set forth in claim 4, wherein said leach lines are in direct fluid communication with said aggregate drains.

7. The aquifer replenishing pavement as set forth in claim 4, wherein said leach lines are co-planar with said aggregate leach field.

8. The aquifer replenishing pavement as set forth in claim 4, wherein the pavement layer is concrete.

9. The aquifer replenishing pavement as set forth in claim 4, wherein the pavement layer is water permeable asphalt.

* * * * *